June 7, 1960  A. CLAUD-MANTLE  2,939,734
BOX LID FASTENER

Filed July 2, 1957  3 Sheets-Sheet 1

INVENTOR
Arthur Claud-Mantle
BY Rockwell & Bartholow
ATTORNEYS

June 7, 1960   A. CLAUD-MANTLE   2,939,734
BOX LID FASTENER
Filed July 2, 1957   3 Sheets-Sheet 2
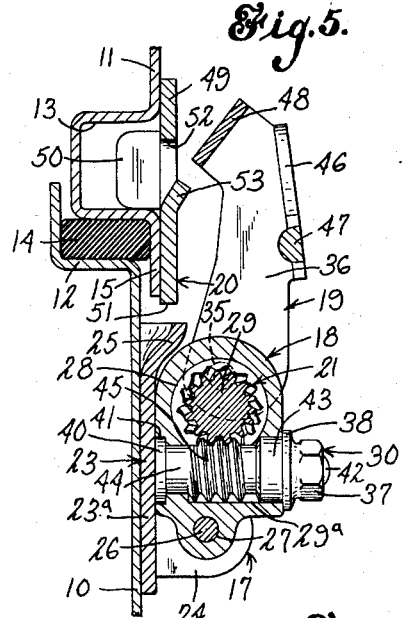
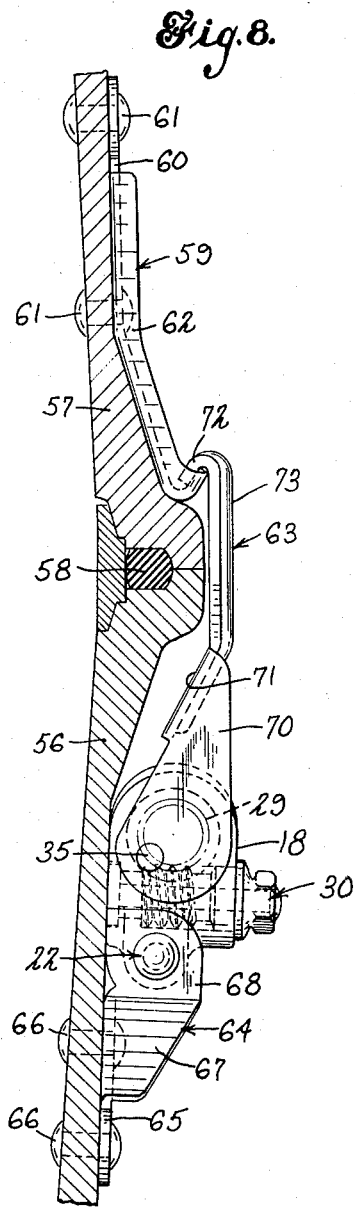
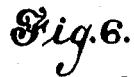
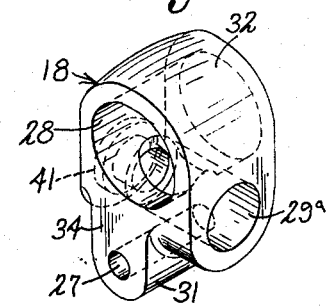
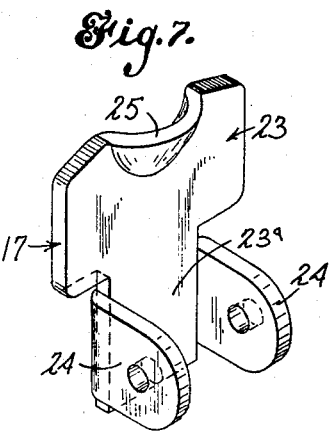
INVENTOR
Arthur Claud-Mantle
BY Rockwell & Bartholow
ATTORNEYS June 7, 1960 A. CLAUD-MANTLE 2,939,734
BOX LID FASTENER
Filed July 2, 1957 3 Sheets-Sheet 3

INVENTOR
Arthur Claud-Mantle
BY
ATTORNEYS

United States Patent Office 2,939,734
Patented June 7, 1960

2,939,734

BOX LID FASTENER

Arthur Claud-Mantle, Trumbull, Conn., assignor to The Bassick Company, Bridgeport, Conn., a corporation of Connecticut Filed July 2, 1957, Ser. No. 669,569

3 Claims. (Cl. 292—64)

This invention relates to fasteners and, while not limited thereto, relates to fasteners particularly useful on boxes, especially boxes and like containers used for carrying and storing articles which must be protected from moisture, vapor and the like. Such containers usually include a lower body part, an upper lid part, and gasket means carried by one of the parts and adapted to provide an effective seal between the parts when compressed by the latter through the action of the fasteners.

One object of the invention is to provide a fastener of the type indicated above, having parts of novel construction and arrangement, which has a number of advantages.

Another object is to provide a fastener such as characterized above, which is admirably suited for mounting externally of the box and which is also well suited for mounting in a manner to apply a predetermined compressive force on a gasket.

Another object of the invention is to provide a fastener having few and simple parts and which is very easily assembled.

Othere objects of the invention will be apparent from the following detailed description of two forms of the fastener which are illustrated in the accompanying drawings by way of example.

In the drawings:

Fig. 5 is a view similar to Fig. 3 but illustrates the fastener in released condition;

Fig. 6 is a perspective view illustrating a gear housing employed in the fastener;

Fig. 7 is a perspective view of a lower bracket member employed in the fastener;

Fig. 8 is a view similar to Fig. 1 but illustrating a somewhat different box structure and a modified form of the fastener;

For the protection of instruments and other articles or apparatus requiring protection from moisture, vapor or the like, containers or boxes made of metal or other suitable material have been used and fasteners have been employed with such boxes to exert pressure on the box body and lid to compress a gasket or like sealing member therebetween. However, some of the fasteners heretofore employed on such boxes have been open to certain objections and the present invention contemplates the provision of a fastener overcoming these objections. In the form shown in Figs. 1 through 7 of the drawings the box body is indicated at 10 and box lid at 11. The box body has a shouldered rim portion 12 and the lid is provided with a laterally opening peripheral channel 13. The arrangement is such that the compressible gasket member 14 may be sandwiched between the shouldered portion 12 of the box body and the portion of the lid forming the channel 13, in the manner indicated in Fig. 1. It may be noted that below the channel 13 the lid is provided with a rim portion 15 extening outwardly of the body and beyond the shouldered portion 12 of the body, as shown in the last-mentioned view. In this instance the box is formed of metal and the fastener is of a type especially suited for mounting externally of the box. The fastener is indicated generally at 16 and it will be understood that while only one fastener is illustrated, any desired number of fasteners may be employed on the box structure to exert a sealing effect on the box lid.

Figure 1:
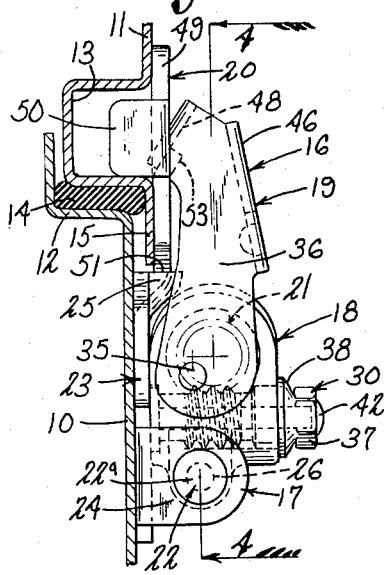
Fig. 1 is a fragmentary view of a container or box, illustrating the same in vertical section, and illustrating a fastener embodying the invention.
Figure 3:
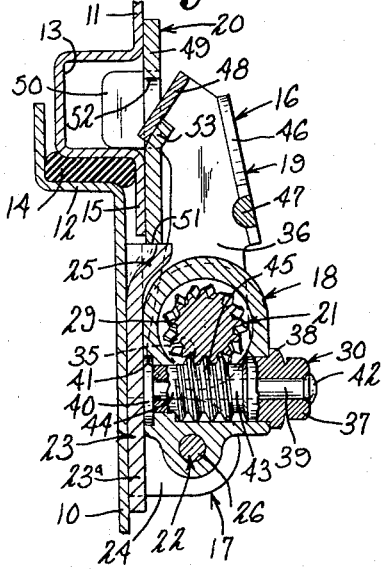
Fig. 3 is a sectional view taken on line 3—3 of Fig. 2.
Figure 4:
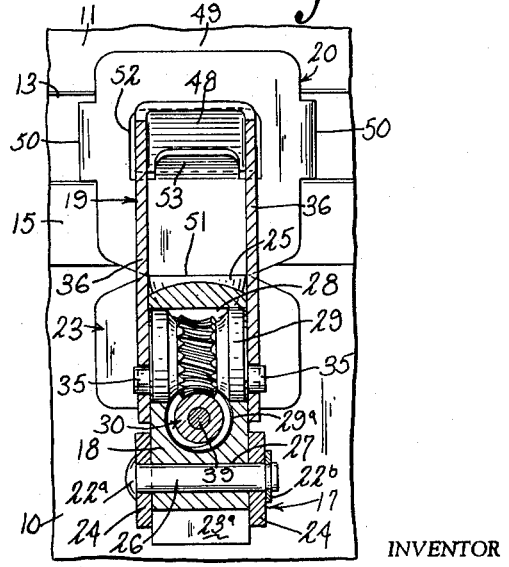
Fig. 4 is a sectional view taken on line 4—4 of Fig. 1.

The fastener 16 includes a lower bracket member fixed to the outer face of the box body 10 below the shoudered portion 12 thereof. A link constituting a gear housing is pivoted on the lower bracket member and is also pivoted to a retainer-engaging link, the last-mentioned link being pivoted to the gear housing through gearing extending into the latter. The retainer-engaging link cooperates with an upper bracket member or retainer fixed to the lid of the box. Turning now to the details of the form of the fastener shown in Figs. 1 through 7, the lower bracket member is indicated at 17, the link constituting the gear housing at 18, the retainer-engaging link at 19, and the upper bracket member or retainer at 20. The gearing extending into the gear housing and pivotally mounting the retainer-engaging link is indicated generally at 21, and the pivot, interconnecting the lower bracket member and the link constituting the gear housing, at 22. The lower bracket member 17, as shown in Fig. 7, includes an upwardly arranged plate part 23 generally of T shape applied to the external face of the box body in flatwise relationship as by welding. A pair of lugs 24 are formed integrally with the plate part 23, the lugs 24 being disposed at the respective sides of the upwardly extending leg 23ª of the T-shaped part. The lugs 24 project outwardly from the box body, as indicated in Fig. 1, and the upper extremity of the T-shaped part 23 is bulged outwardly from the box body, as at 25. The pivotal connection between the lower bracket member and the link 18 includes a pin 26 extending through the lugs 24 of the bracket member. As best shown in Fig. 4, the pin at one end thereof is provided with a head 22ª bearing against one of the lugs 24, while at the other end thereof the pin is provided with a circumferential groove receiving a snap ring 22ᵇ bearing against the other lug 24, the arrangement being such that the axial movement of the pin is prevented. As shown in the last-mentioned view, the link 18 is closely received between the lugs 24.

The link 18 constituting the gear housing is best shown in Fig. 6. The link has a lower transverse bore 27 for receiving the pivot pin 26 and an upper larger transverse bore 28 into which the worm wheel 29 extends. Below the bore 28 and above the bore 27 the link 18 is provided with a bore 29ª into which the worm shaft 30 extends, the bore 29ª being disposed at right angles to the bore 28 and intersecting the latter. The lower extremity of the link 18 is reduced in width (see Fig. 6) and is rounded, as at 31. The upper part of the link 18 is of greater width and is rounded, as at 32. The sides 34 of the link are flat. As shown in Fig. 4, the eccentric trunnions 35 of the gear wheel 29 extend beyond the sides 34 of the link and are received in pivotal relation in the arms 36 of the retainer-engaging link 19 which is of bifurcated form. As shown in Fig. 4, the flat side faces of the gear wheel 29 are closely received between the arms 36, and the arrangement is such that the retainer-engaging link 19 is mounted on the gear wheel 29 for bodily or translatory movement on the axis of the wheel 29 and also mounted for non-translatory movement on the axes of the trunnions 35. In the instant form the trunnions 35 are integrally formed with the wheel 29.

The worm wheel 29 meshes with the worm shaft 30 having, in this instance, an operating head of non-round or hexagonal form protruding from the forward or outer face of the link 18, the head being indicated at 37. Thus the shaft may be turned with a suitable wrench. The shaft 30 is provided with a radial flange 38 abutting the outer face of the link 18 to limit inward axial movement of the shaft. A pin 39 extends through the shaft 30 in an axial direction and has a head 40 bottoming in a counterbore 41 which, at the rear or inner face of the link 18, forms an enlargement of the bore 29ª. The outer end of the pin 39 is peened over the outer end of the shaft 30, as at 42. The arrangement is such that axial displacement of the shaft 30 in an outward direction is prevented. Adjoining and inwardly of the flange 38 the shaft 30 is provided with a cylindrical portion 43 forming a bearing surface for the outer end portion of the shaft 30. Adjoining and outwardly of the head 40 the shaft 30 is provided with a smaller cylindrical portion 44 forming a bearing surface for the inner end portion of the shaft. Intermediate the shaft portions 43 and 44 the shaft is provided with a worm thread, as at 45.

The arms 36 of the bifurcated retainer-engaging link 19 are of plate-like construction and have the outline indicated in Fig. 1. The lower extremities of the arms 36 are rounded in the manner indicated in the last-mentioned view and in the operative position of the link 19 substantially cover the respective side faces of the gear wheel 29. The plate-like arms 30 closely straddle the link 18 and, to prevent separation of the arms, two flanges 46 are provided on the link 19, each flange 46 being formed integrally with one arm 36. The flanges 46 are arranged in opposing relationship, the flanges 46 being welded to one another, as at 47, and forming, in effect, a web portion. At the upper extremity of the link 19, a plate-like part 48 interconnects the arms 36 and is formed integrally with the latter. The plate-like part 48, which has latching engagement with the upper bracket member or retainer 20, is inclined upwardly in a plane forming an acute angle with the plane in which the flanges 46 are disposed, as indicated in Fig. 1. The plate-like part 48 forms, in effect, a hook. As shown in the last-mentioned view, the plate-like part 48 is spaced inwardly from the flanges 46.

Figure 2:
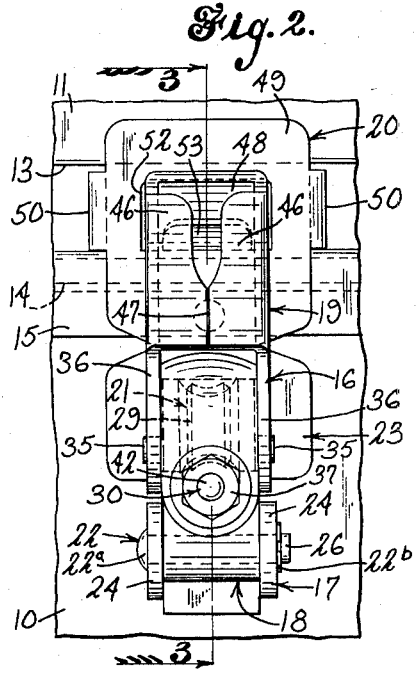
Fig. 2 is a fragmentary elevational view illustrating the outer face of the fastener, the fastener being shown in latched condition.

The upper bracket member or retainer 20 includes a planar plate portion 49 arranged vertically in flatwise engagement with the box lid 11. As shown in Fig. 2, the plate portion 49 is generally rectangular and extends above and below the channel 13 formed in the box lid. Integral with the plate portion 49 are a pair of lugs 50, the lugs 50 being disposed at the respective sides of the portion 49 and extending into the channel 13. The lugs 50 are of a height somewhat less than the vertical dimension of the channel 13 and the lugs 50 engage the lower laterally extending part of the channel. The upper bracket member or retainer 20 is welded to the lid 11 and at the lower extremity of the plate portion 49 has a horizontally extending straight edge 51 of a length approximating the horizontal dimension of the bulge 25 in the upper part of the lower bracket member 17. The central region of the plate portion 49 is cut out, as at 52, and a tongue 53 is struck up for cooperation with the latching part 48 of the retainer-engaging link 19. The tongue 53 is upwardly inclined, as shown in Fig. 3.

The operation of the fastener is as follows. When the retainer-engaging link 19 is in unlatched condition, the link 19 may be grasped and moved over the tongue 53 of the retainer. The worm shaft 30 is then operated by a wrench to turn the shaft in a direction to rotate the trunnions 35 on the worm wheel (see Fig. 1) counterclockwise. This movement draws the latching part 48 of the retainer-engaging link down on the tongue 53 to pull the box lid 11 downwardly, thereby compressing the gasket 14. The upper and lower bracket members are arranged relatively to one another so that when the lid is fully latched, the upper bracket member is in firm engagement with the lower bracket member to limit further downward movement of the box lid. Thus a predetermined compressive force may be exerted on the sealing gasket 14. When the lid is fully latched, the straight edge 51 of the upper bracket member is in engagement with the bulge 25 formed in the lower bracket member and it will be understood that the bulge 25 facilitates contact of the upper bracket member with the lower bracket member as the lid is clamped, i.e., the bulge protrudes from the side wall of the box body a sufficient distance for the upper bracket member to strike the lower bracket member as the former is lowered. The fastener is illustrated in its operative or latched condition in Fig. 1.

When it is desired to release the retainer-engaging link 19 from the retainer, the shaft 30 is rotated by the wrench in the opposite direction to thereby effect rotation of the trunnions 35 in a clockwise (Fig. 1) direction. The shaft 30 is rotated in the last-mentioned direction until the retainer-engaging link 19 has been lifted bodily on the worm wheel 29 at least a distance sufficient to clear the tongue 53. When and as the retainer-engaging link 19 is lifted from the latched position of Fig. 1 to the released position of Fig. 5, the inclined latching part 48 of the link may strike the means defining the opening 52 in the upper bracket member so as to be cammed outwardly by the latter, that is, swung outwardly on the axis of the trunnions 35, if the link 19 is not sooner swung out to this position solely by the force of gravity. From the foregoing it will be understood that when movement of the retainer-engaging link from the position of Fig. 5 to the position of Fig. 1 is effected, turning movement of the shaft 30 and the wheel 29 is limited by engagement of the upper bracket member with the lower bracket member. The fastener is very easy to operate and exerts a superior clamping effect on the box lid with which it is associated. Furthermore, the fastener is constituted by few and simple parts and is very easily assembled. In connection with the assembly of the fastener, it may be noted that the upper and lower bracket members may first be applied to the respective parts of the box. The preassembled link 19, link 18, gear wheel 29 and shaft 30 may then be applied to the lower bracket member as a unit and secured by the pin 26. To facilitate insertion of the pin 26 through the lugs 24 and the link 18, the upper part of the link 18 may be swung outwardly from the box body on an axis approximating that of the bore 27.

Figure 9:
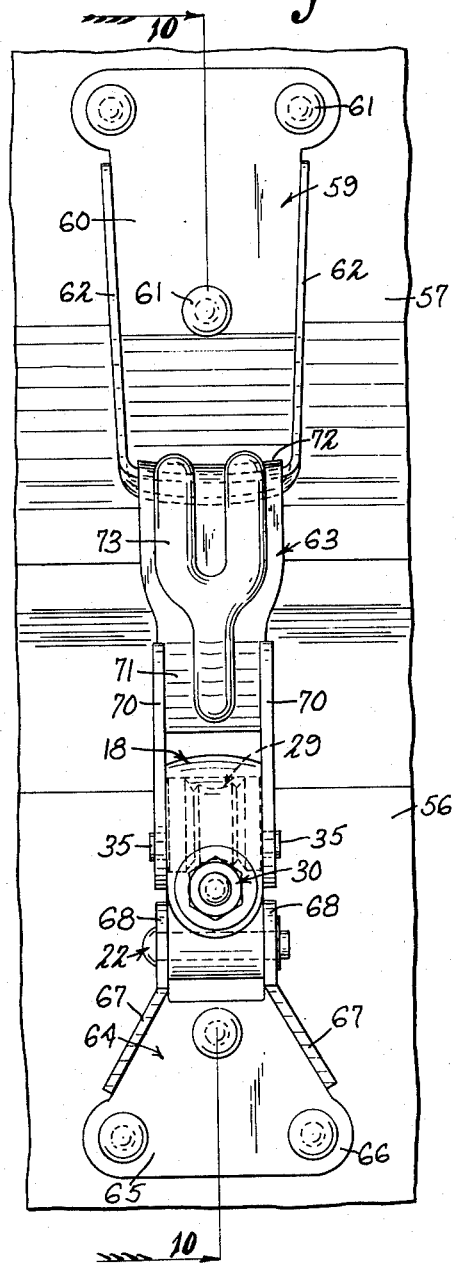
Fig. 9 is a view similar to Fig. 2, further illustrating the last mentioned form of the fastener.
Figure 10:
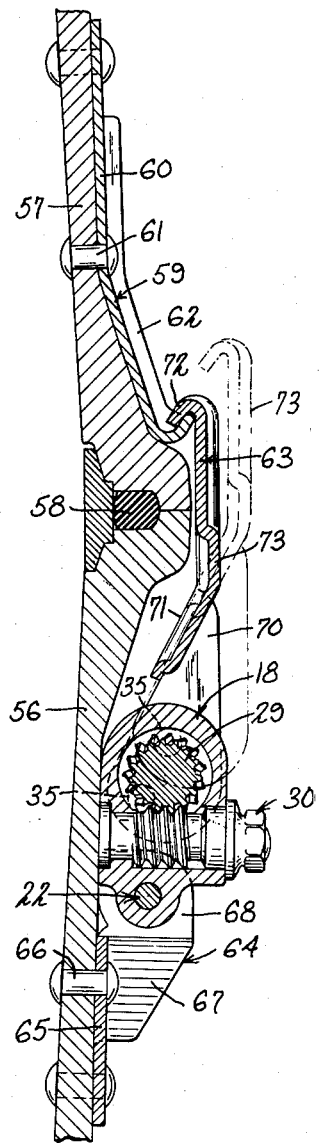
Fig. 10 is a sectional view taken on line 10—10 of Fig. 9.

In the modified form shown in Figs. 8 through 10, the link constituting the gear housing, the gear wheel, the worm shaft and the means of pivoting the link on the lower bracket member are identical to those in the first form and need no further description. The box, in vertical cross section, has the form shown in Fig. 8, the body of the box being indicated at 56 and the box lid at 57. The box is formed of plastic material. It may be noted that in this form the rim of the body 56 and the rim of the lid 57 meet when the lid is fully secured by he fastener. A rubber-like gasket 58, disposed in a channel formed by cooperating portions of the rim of the body and the rim of the lid, is compressed between the lid and the body when the lid is drawn down tightly on the body to the position of Fig. 8.

The upper bracket member 59 comprises a plate-like part 60 secured to the lid 57 by rivets 61. The plate part 60 is elongated in an upward direction and has a bent-up outwardly extending marginal portion 62 generally of U-shape, the lower part of the U-shaped marginal portion 62 being tipped upwardly, as shown in Fig. 10. The last-mentioned part of the marginal portion 62 is engageable by a link 63 mounted on the gear wheel 29 in the manner identical to the mounting of the link 19 described above. The lower bracket member 64 is of the shape shown in Figs. 8 and 9. The member 64 includes a generally triangular plate portion 65 riveted to the box body by rivets 66. The member 64 also includes outwardly extending flanges 67 formed integrally with lugs 68 similar to the lugs 24 of the above-described bracket member 17. The link 18 is closely received between the lugs 68 and is secured to the same in a manner identical to that described in connection with the first form of the fastener. The retainer-engaging link 63 has the form shown in Figs. 8 and 9.

The link 63 is of bifurcated form and has plate-like arms 70 receiving the respective trunnions 35. The link 63 is mounted on the gear wheel 29 in a manner identical to the mounting of the link 19. The plate-like arms 70 of the link 63 are interconnected by an integrally formed web portion 71 which in the position of the link 63 shown in Fig. 8 is disposed at the upper ends of the legs 70 and extends upwardly beyond the legs 70 and merges into a hook 72 for engagement with the retainer. The web portion 71 is ribbed longitudinally of the link 63, as at 73, to strengthen this portion of the link. The latched position of the retainer-engaging link 63 is shown in full lines in Fig. 10. When the link 63 is in this position, the hook 72 engages over the lower part of the marginal portion 62 of the upper bracket member or retainer. When the link 63 is engaged with the retainer and the rim of the lid is in firm engagement with the rim of the box body, movement of the gear wheel 29 and the shaft 30 in a direction to effect counterclockwise (see Fig. 10) movement of the trunnions 35 is prevented. Thus there is no need for the upper bracket member to engage the lower bracket member to achieve a predetermined compressive force on the gasket. The shaft 30 may be turned by a suitable wrench to effect movement of the link 63 from the full-line or latched position of Fig. 10 to the released or broken-line or unlatched position of Fig. 10. It may be noted that as the link 63 is raised bodily by the gear wheel 29 a distance sufficient to clear the lower part of the marginal portion 62, the link 63 may pivot on the axis of the trunnions 35 and swing outwardly from the retainer by the force of gravity. To clamp the lid to the box body the worm shaft 30 is rotated by the wrench in a direction to effect rotation of the trunnions in a counterclockwise (Fig. 10) direction.

In accordance with the foregoing disclosure, there is provided an improved fastener for containers or boxes used for the transportation or storage of articles which must be protected from moisture, vapor and the like. The fastener is of the type applied to a box or the like externally of the latter. While the fastener has been disclosed herein as having a retainer mounted on the box lid and a retainer-engaging link mounted on the box body, it will be understood that, if desired, the parts may be reversed. The retainer may be mounted on the box body and the retainer-engaging link mounted on the lid. The fastener has parts of novel construction and arrangement and is very dependable in service. Another advantage of the fastener is that it is constituted by few and rugged parts and is relatively inexpensive to manufacture. As previously pointed out, a further advantage of the fastener resides in the ease with which the fastener may be assembled to a container or box.

While two forms of the fastener have been illustrated and described above, it will be apparent that the fastener is suceptible of various modifications and changes in detail without departing from the principles of the invention and the scope of the claims.

What I claim is:

1. In a fastener for releasably securing together two elements of a box and having a bracket member for external mounting on one element and constituting a retainer, a second bracket member for external mounting on the other elements, a link pivoted to the second bracket member for nontranslatory swinging movement in a vertical direction, the link constituting a gear housing having a worm wheel therein meshing with an operating shaft extending outwardly from the link, and a retainer-engaging link operated by turning movement of said shaft and mounted eccentrically and pivotally on said worm wheel for vertical swinging movement.

2. In a fastener for releasably securing together a box body and lid and having an upper bracket member for external mounting on the lid and constituting a retainer, a lower bracket member for external mounting on the box body, a link for nontranslatory swinging movement in a vertical direction and for pivotal connection to the lower bracket member, the link constituting a gear housing having a worm wheel therein meshing with an operating shaft extending outwardly from the link, a retainer-engaging link operated by turning movement of said shaft and mounted eccentrically and pivotally on said worm wheel for vertical swinging movement, the links forming a subassembly, and a pin for pivotally attaching the subassembly to the lower bracket member, the pin being extensible through the first-mentioned link and through a portion of the lower bracket member.

3. In a fastener for releasably securing together a box body element and a lid element, one of the elements having a peripheral laterally opening channel formed in the rim portion thereof and the other element having a bracket member constituting a retainer connected thereto, the combination of a bracket member for external connection to the first-mentioned element, a link pivoted to the first-mentioned bracket member for nontranslatory swinging movement in a vertical direction, the link constituting a gear housing having a worm wheel therein meshing with an operating shaft extending outwardly from the link, and a bifurcated retainer-engaging link operated by turning movement of the shaft and straddling the worm wheel, the retainer-engaging link having plate-like arms mounted eccentrically and pivotally on said worm wheel for vertical swinging movement, the last-mentioned link having a web portion interconnecting the arms and an interconnecting plate part spaced inwardly from said portion, the plate part being a latching part engageable with the retainer and being in a plane forming an acute angle with the plane of the web portion, the retainer-forming bracket member comprising a plate portion extending over the channel and having a pair of lugs extending into the channel and bottoming on one side thereof, the last-mentioned plate portion having an opening formed therein in the region of the channel and having a tongue struck up for cooperation with said plate-like part of the retainer-engaging link.

References Cited in the file of this patent

UNITED STATES PATENTS

| | | |
|---|---|---|
| 1,083,438 | Dohse | Jan. 6, 1914 |
| 2,036,151 | Lang | Mar. 31, 1936 |
| 2,719,745 | Kent et al. | Oct. 4, 1955 |
| 2,751,240 | Claud-Mantle | June 19, 1956 |

UNITED STATES PATENT OFFICE

CERTIFICATE OF CORRECTION

Patent No. 2,939,734 June 7, 1960

Arthur Claud-Mantle

It is hereby certified that error appears in the printed specification of the above numbered patent requiring correction and that the said Letters Patent should read as corrected below.

Column 3, line 35, for "arms 30" read -- arms 36 --; column 6, line 10, for "elements" read -- element --.

Signed and sealed this 8th day of November 1960.

(SEAL)
Attest:

KARL H. AXLINE
Attesting Officer

ROBERT C. WATSON
Commissioner of Patents